United States Patent [19]
Duckworth

[11] Patent Number: 5,884,582
[45] Date of Patent: Mar. 23, 1999

[54] PET FEEDER

[76] Inventor: Margaret L. Duckworth, 414 Penn St., Hollidaysburg, Pa. 16648

[21] Appl. No.: 831,145

[22] Filed: Apr. 1, 1997

Related U.S. Application Data

[60] Provisional application No. 60/023,919, Aug. 14, 1996.
[51] Int. Cl.[6] .............................. A01K 5/01; A01K 7/00
[52] U.S. Cl. ............................................. 119/61; 119/51.5
[58] Field of Search ................................ 119/51.12, 51.5, 119/52.4, 61, 72, 165

[56] References Cited

U.S. PATENT DOCUMENTS

| | | |
|---|---|---|
| 556,900 | 3/1896 | Richmond . |
| 804,991 | 11/1905 | Alkire et al. . |
| 1,172,985 | 2/1916 | Hager . |
| 1,831,593 | 11/1931 | Garvey . |
| 2,584,301 | 2/1952 | Sinclair . |
| 2,612,137 | 9/1952 | Fuls . |
| 3,651,787 | 3/1972 | Cooper . |
| 4,364,355 | 12/1982 | Livingston . |
| 4,450,791 | 5/1984 | Briggs ........................................ 119/61 |
| 4,481,907 | 11/1984 | Blicher . |
| 4,860,691 | 8/1989 | Mayer ..................................... 119/51.5 |
| 4,961,401 | 10/1990 | Hellerman ................................. 119/61 |
| 5,392,733 | 2/1995 | Tominaga ................................. 119/165 |
| 5,558,041 | 9/1996 | Fairall, Jr. et al. ...................... 119/165 |

FOREIGN PATENT DOCUMENTS

| | | |
|---|---|---|
| 390245 A | 10/1990 | European Pat. Off. . |
| 740985 | 2/1933 | France . |
| 113855 | 3/1918 | United Kingdom . |
| 389371 | 3/1933 | United Kingdom . |

*Primary Examiner*—Robert P. Swiatek
*Attorney, Agent, or Firm*—Richard C. Litman

[57] ABSTRACT

A pet feeder holding food and/or water dishes for domestic animals. The pet feeder helps to keep pets from scattering their food or splattering their drink out of their dishes, and is especially useful for preventing dogs with floppy ears from getting their ears wet. In the preferred embodiment, the invention has interfitting top and bottom parts. The top part has a handle, and two opposite openings. Likewise, the bottom part has a bottom surface, and two opposite openings, which continue and are equal in width with the openings in the top part. Within each opening a dish can be placed, which may contain food or water. Normally, food will be placed in one dish, and water in the other. In an alternative embodiment, there is a hole in the top part to retain a water bottle allowing two different foodstuffs being placed in the dishes. The device prevents the long, floppy ears of certain animals from getting into the bowl. The top part may be lifted off the bottom part, using the handle. In yet another alternative embodiment, the device is a single unitary part, having a handle, a pair of opposing openings, and an optional retainer for a water bottle, or the like.

7 Claims, 4 Drawing Sheets

PET FEEDER

CROSS-REFERENCE TO RELATED APPLICATION

This application claims the benefit of U.S. Provisional Patent Application Ser. No. 60/023,919, filed Aug. 14, 1996.

BACKGROUND OF THE INVENTION

1. FIELD OF THE INVENTION

The present invention relates generally to a pet feeder, and more particularly pertains to a feeder for holding food and water dishes which provides for the maintenance of a groomed pet having long ears.

2. DESCRIPTION OF THE RELATED ART

Animal feeding devices are well known in the art. Particularly, feeding devices having separate compartments are widely used in many areas. Such types of separate compartment feeding devices are found in places like zoos or farms, allowing multiple animals individually to feed or drink without interference from an adjacent animal. Feeding dishes for domesticated animals also are well known. Compartmentalized feeding dishes provide a single unit for holding food and water independently, so as to conveniently provide nourishment for the animal. This convenience produces a significant dilemma for the animal owner. The dilemma is, in particular, maintaining animal grooming. For example, a long-eared show dog feeding and or drinking from a dish often will have its ears fall into the dish. The results are quite obvious: after eating or drinking, the owner must clean the ears of the dog. This is an inevitable occurrence each time the dog feeds or drinks. The prior art does not provide any type of feeding device suitable for reducing the amount of time for maintaining the appearance of the animal, or minimizing the attention necessary for maintaining the appearance of the animal.

U.S. Pat. No. 556,900, issued on Mar. 24, 1896, to Don L. Richmond, discloses a combined feed box and manger, in which the manger can be swung out of the way when hay or other feed is fed to an animal. The instant invention is distinguishable, in that it has no pivotally moving parts.

U.S. Pat. No. 804,991, issued on Nov. 21, 1905, to John W. Alkire and Jacob Orndorff, discloses a feed trough having a plurality of alternating upward-slanting U-shaped members on the tops of each of two sides, through which animals can feed, and a bottom with a V-shaped cross-section in which food or water is placed. The instant invention is distinguishable, in that it has a flat bottom, in which separate food and water dishes can be placed, and the openings through which the animal feeds are also flat and parallel with the bottom.

U.S. Pat. No. 1,172,985, issued on Feb. 22, 1916, to Michael Joseph Hager, discloses a feed rack for calves. The feed rack includes a plurality of vertical partitions for separating the calves during feeding, and a bowl fastened to the rack intermediate each set of adjacent partitions and near the ends of the rack. Each bowl is elevated from the ground on which the animals stand while feeding. The instant invention is distinguishable, in that it is designed for only one animal, with space for both food and water dishes provided, with the dishes not being substantially elevated above the surface on which the animal feeds, which is more suitable for smaller animals such as dogs.

U.S. Pat. No. 1,831,593, issued on Nov. 10, 1931, to Frank A. Garvey, discloses an outdoor feeding device for animals that is designed especially for foxes on fox ranches. The device includes a plurality of feeding dishes fixed in place, under a roof on the device to protect the food from the weather, and on a platform elevated from the ground. The instant invention is distinguishable in that it may be used indoors, it is for only one animal, and it has separate openings for a food dish and a water dish.

U.S. Pat. No. 2,584,301, issued on Feb. 5, 1952, to Melroy Sinclair, discloses a moated dog feeder with separate dishes for food and drink that are elevated from the ground. Each dish is protected by a water-filled moat to keep ants and similar pests out of the dish. The instant invention has no moats, but does have sides that can keep the long-ears of a feeding pet from falling into the dishes.

U.S. Pat. No. 2,612,137, issued on Sep. 30, 1952, to Charles C. Fuls, discloses a self-feeder for rabbits or other animals, with two oppositely positioned compartments, each having openings with downwardly directed flanges to prevent the animal from scattering the food. The instant invention is distinguishable, in that it allows both food and water to be placed in separate dishes, and the openings are in both horizontal and vertical sides of the feeder.

U.S. Pat. No. 3,651,787, issued on Mar. 28, 1972, to Pauline E. Cooper, discloses an adjustable pet feeding stand, the height of which is vertically adjustable. It does not disclose the oppositely positioned openings of the instant invention.

U.S. Pat. No. 4,364,335, issued on Dec. 21, 1982, to Allan Livingston, discloses an animal feeder with a cone in the center of a circular member such as a tire. Feed is placed in tale space between the cone and the circular member. The instant invention is distinguishable, in that it allows the animal to feed only at specific separate openings, one of which may contain food, while another has water.

U.S. Pat. No. 4,481,907, issued on Nov. 13, 1984, to Steen Blicher, discloses a method and apparatus for feeding animals. The apparatus includes a plurality of separate feeding places in a row, with obstacles designed to encourage the rooting instincts of animals such as hogs. The instant invention is distinguishable, in that it is designed to provide food and drink to only one animal, and does not have obstacles to encourage rooting.

U.S. Pat. No. 4,860,691, issued on Aug. 29, 1989, to Lowell A. Mayer, discloses an animal feeder with separate compartments for food and water which an animal can access from the same side of the feeder. The instant invention is distinguishable, in that its compartments can be accessed by the animal only from opposite sides of the feeder.

U.S. Pat. No. 4,961,401, issued on Oct. 9, 1990, to John E. Hellerman, discloses a manger divider that is removably attached to a stall frame and stanchion for livestock. The instant invention is distinguishable, in that it does not require a pre-existing manger, frame or stanchion.

British Patent No. 113,855, complete specification accepted on Mar. 14, 1918, to Fleetwood Hesketh, discloses a feeding trough for poultry, with bars over the top of the trough to prevent feed from being scattered. The instant invention is distinguishable, in that it is not a trough, but rather a box with oppositely positioned openings to allow an animal access to food and water dishes.

French Patent No. 740,985, published on Feb. 3, 1933, to Robert E. Gardiner, and British Patent No. 389,371, complete specification accepted on Mar. 16, 1933, to Robert Ernest Gardiner, disclose an animal feeder, being a trough with a plurality of compartments, with halters by which the neck of each animal feeding is held, so that it cannot withdraw its head. The instant invention is distinguishable, in that it does not have a trough, it is not designed for a plurality of animals, and it does not prevent an animal from withdrawing its head from an opening.

European Patent Application No. 390,245, published on Oct. 3, 1990, to Guido Dervaux, discloses a feeding trough for rabbits or other animals. The trough is covered by a tunnel with apertures having flexible shutters which limit access for young animals that, cannot push open the shutters, but allows older animals (that are strong enough to push back the shutters) to feed. The instant invention is distinguishable, in that it does not have a trough or shutters.

As can be seen from the prior art, a feeding device that provides access to food and/or drink of the animal, while maintaining the appearance of the animal is not found. In addition, a device capable of maintaining the appearance of an animal, by reducing the occurrences of regrooming the animal after each feeding or drinking is not found in the prior art. None of the above inventions and patents, taken either singly or in combination, is seen to describe the instant invention as claimed.

SUMMARY OF THE INVENTION

In the interest of maintaining a well groomed pet, for the purposes good hygiene, reduction of parasites and pests, and for having an animal the is always presentable, the present invention provides a pet owner these advantages. The present invention is a food dish covering device that prevents the animal from dropping and scattering food and/or water over the floor (or other surface area). In addition, the present invention helps to maintain the grooming of the animal by keeping the ears of the animal out of the food and water dishes. The invention is useable by any type of long-eared animals such as, dogs, rabbits, etc. This is accomplished by providing two oppositely positioned openings within which food and water dishes are placed. Animals may reach each dish from only one direction, which prevents pets from scattering their food or splattering their drink out of their dishes. In addition, the invention is especially useful for preventing dogs with floppy ears from getting their ears soiled (with food) or wet, because when the dog inserts its head through an opening to reach a dish, its ears will be retained on the sides of the opening.

In the preferred embodiment, the invention has a top part and a bottom part. The top part has a handle, a top surface, two parallel long side surfaces on opposite sides of the top surface, four short side surfaces, and two opposite openings. The bottom part has a bottom surface, two parallel long side surfaces (over which the long side surfaces of the top part fit), four short side surfaces (over which the short side surfaces of the top part fit), and two opposite openings, which register and are equal in width with the openings in the top part. Within each opening a dish can be placed, which may contain food or water. Normally, food will be placed in one dish, and water in the other.

In an alternative embodiment, there is a hole in the top part to retain a water bottle, and two different kinds of food can be placed in the dishes. The device can prevent the long, floppy ears of certain breeds of dogs from getting into the bowl. The top part may be lifted off the bottom part, using the handle.

Further, the invention also provides a single unitary embodiment that fits snugly over either a pair of individual dishes or a compartment dish unit. This alternative embodiment provides an added convenience of simplified use by virtue of its placement directly over the dish unit or the pair of dishes.

Accordingly, it is a principal object of the invention to provide a new and improved holder for food and water dishes for an animal.

It is another object of the invention to provide a holder that will prevent an animal from scattering food out of its dish.

It is a further object of the invention to provide a holder that will prevent an animal from upsetting or splattering liquid out of a dish containing water or other drink.

Still another object of the invention is to will prevent an animal with long, floppy ears, from getting its ears wet while drinking from a dish.

It is yet another object of the invention to provide a single unitary member for placing over and holding the food and water dish or dishes while preventing the animal for scattering the contents or soiling the ears.

The objects of the invention are encompassed by a device comprising first and second interfitting members; the first member having a generally flat horizontal surface having at least two opposing edges, a handle integral to and extending from the generally flat horizontal surface in a first direction, and a plurality of edge wall members integral to and extending from the generally flat horizontal surface in a second direction; the second member having a generally flat horizontal surface, parallel to and spaced from the generally flat horizontal surface of the first member, and having at least two opposing edges, and a plurality of edge wall members integral to and extending from the generally flat horizontal surface in the first direction; and each of the at least two opposing edges of the first member and each the edge wall members extending from each the at least two opposing edges of the first and second members defining an opening therein for communicating therethrough; wherein the first and second directions are anti-parallel; wherein the first member removably seats over the second member; wherein the openings allowing a pet to access food and water located within the first and second members; and wherein the ears of the pet being prevented from entering the openings.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a pet feeder for holding food and/or water dishes which prevents the scattering of food or splattering of drink out of the dishes. The pet feeder of the present invention is especially useful for preventing dogs and other animals with floppy ears from getting their ears soiled or wet.

Figure 1:
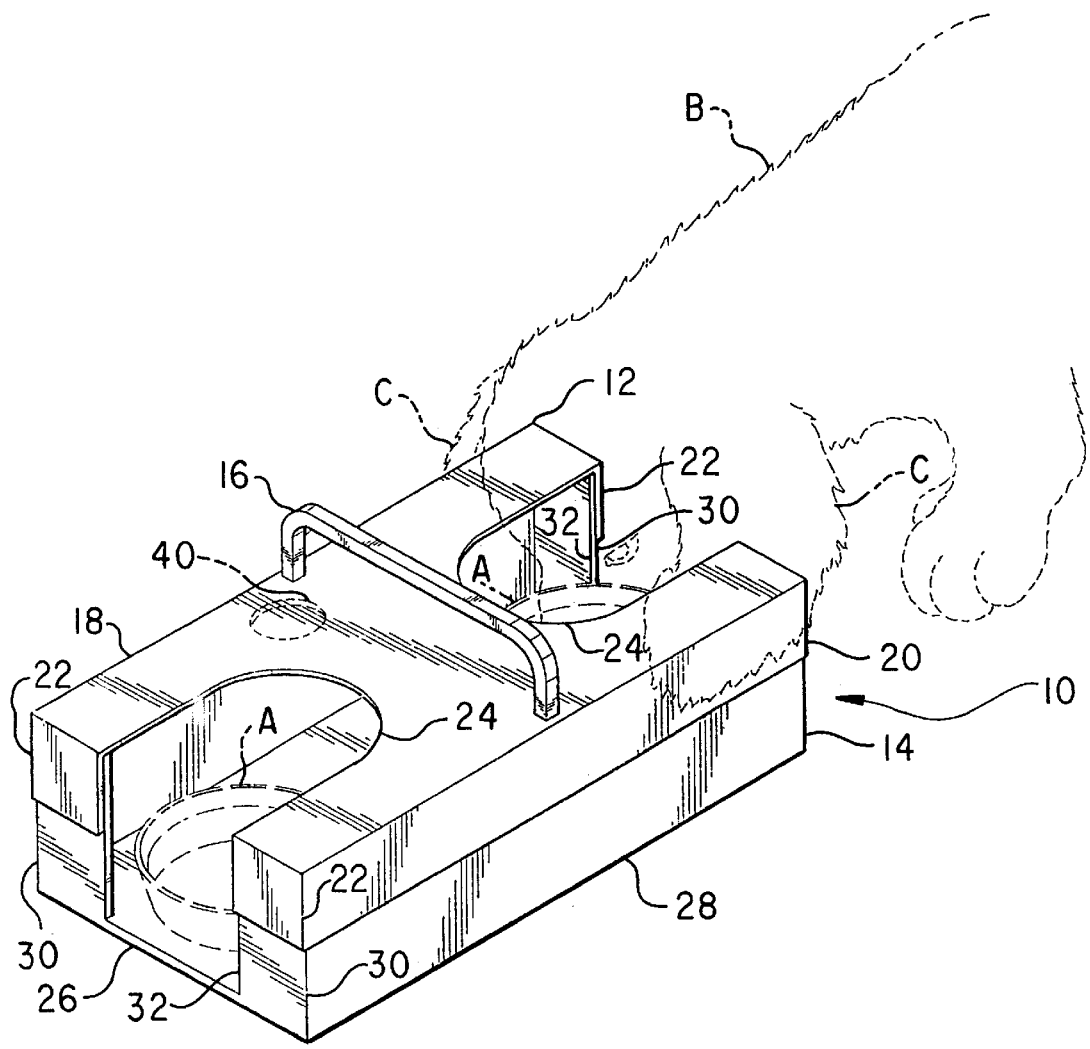
FIG. 1 is an environmental perspective view of the invention.

FIG. 1 is an environmental perspective view of a preferred embodiment of the invention showing a generally rectangular box 10 including the top part 12 interfitting with the bottom part 14. The top part has a handle 16, a top surface 18, two parallel long side surfaces 20 (one of which is hidden from view) on opposite sides of the top surface, four short side surfaces 22 (one of which is completely hidden from view, with another being partially hidden from view), and two opposite openings 24. The bottom part has a bottom surface 26, two parallel long side surfaces 28 (over which the long side surfaces of the top part fit), four short side surfaces 30 (over which the short side surfaces of the top part fit), and two opposite openings, which continue and are equal in width with the openings in the top part. Within each opening a dish A is placed, which may contain food or water. Normally, food will be placed in one dish, and water in the other. Alternatively, there could be an additional holder (such as hole 40, in dotted lines) in the top part 12 for retaining a water bottle (not shown in the drawings), and two different types of foodstuffs could be placed in the dishes. For illustrative purposes, a dog B with floppy ears C is shown feeding from one of the dishes A. It is important to note that the dimensions of the openings 24 are such as to prevent the ears of the dog (or other animal) B from getting into the dish A. The top part 12 may be lifted off the bottom part 14 using the handle 16. The handle 16 also helps to prevent the animal from reaching directly over from a dish in one opening 24 to the dish in the other opening 24, which normally tends to scatter the contents of the dishes. Instead, the pet must walk around from one opening 24 to the other opening 24.

Figure 2:
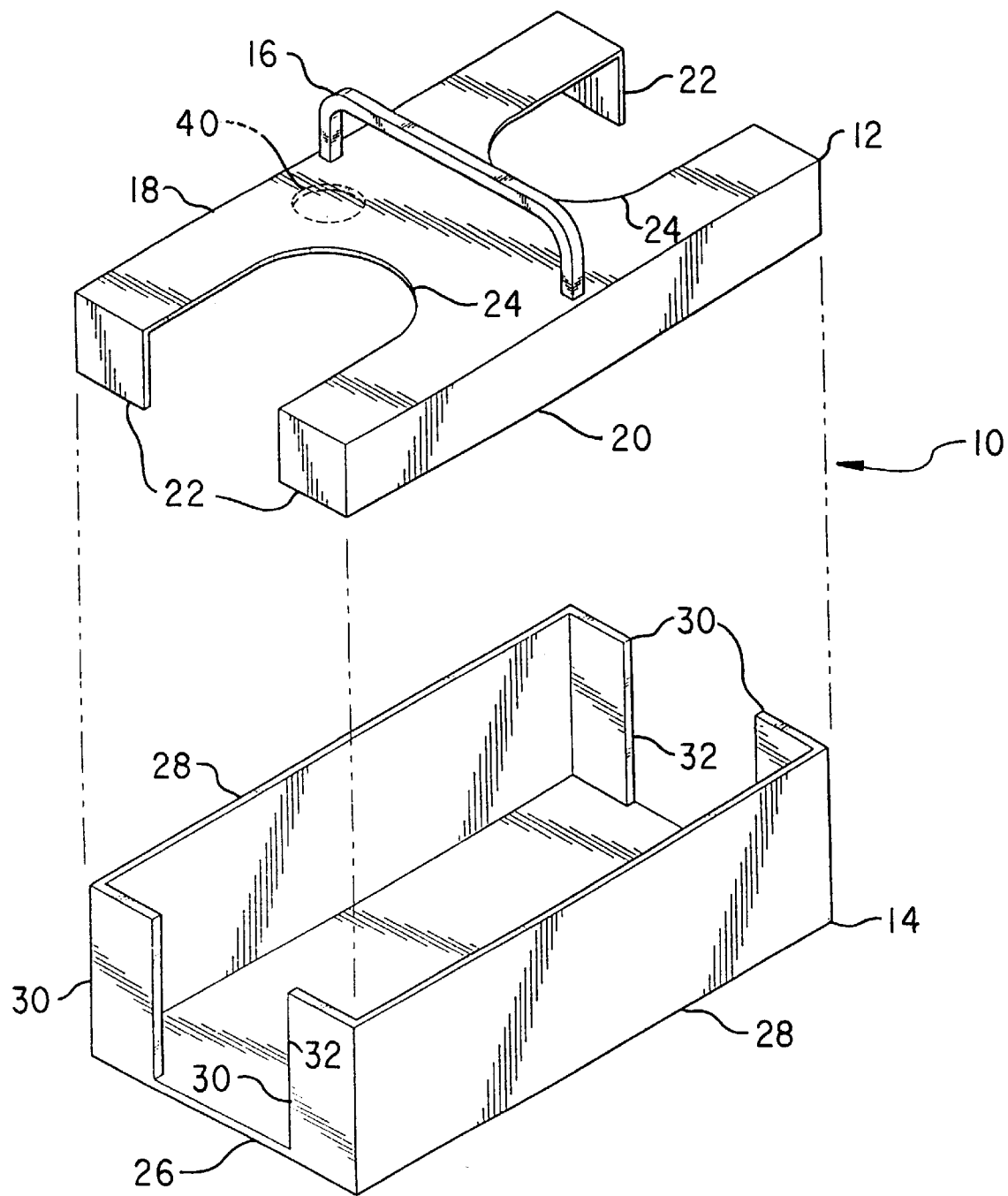
FIG. 2 is an exploded perspective view of the invention.
Figure 3:
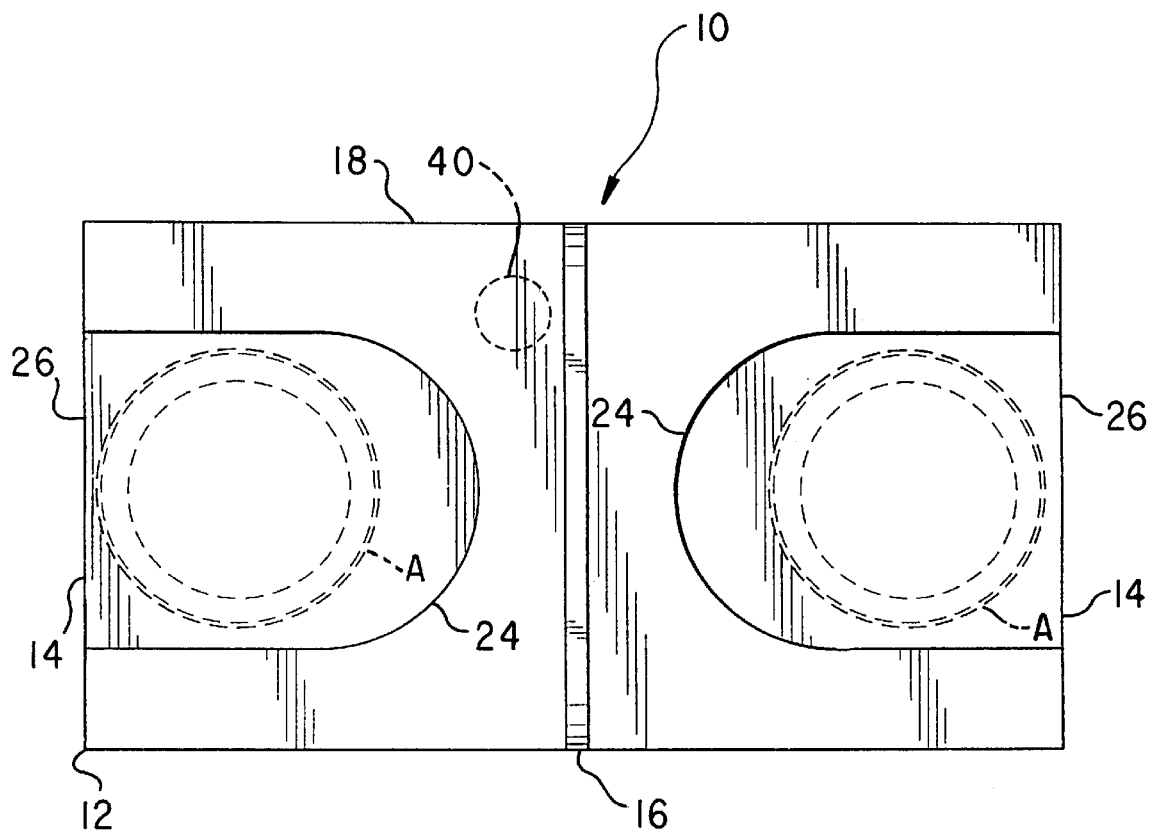
FIG. 3 is a top plan view of the invention.

FIG. 2 is an exploded perspective view of the invention, showing how the top part can be lifted off the bottom part to change the dishes, and better showing the top of the bottom part. It is evident that the handle 16 is symmetrically or equidistantly positioned about the middle of the top part. The handle 16 is preferably formed having two supporting end portions that integrally contact the top part 12 and a middle portion that is supported above the top part 12 via the two end portions. FIG. 3 is a top plan view of the invention, better showing how bowls may be placed within it. The pet (e.g., dog B) is prevented from dragging its ears from bowl to bowl. Also, the food and water are additionally contained within the feeder.

It is preferable that the openings 24 in the top part 12 and the bottom part 14 are between about three and five inches wide, and more preferably about four inches wide. This is sufficient to allow an animal access to the food, yet sufficiently narrow enough to prevent its ears from falling into the food.

Figure 4:
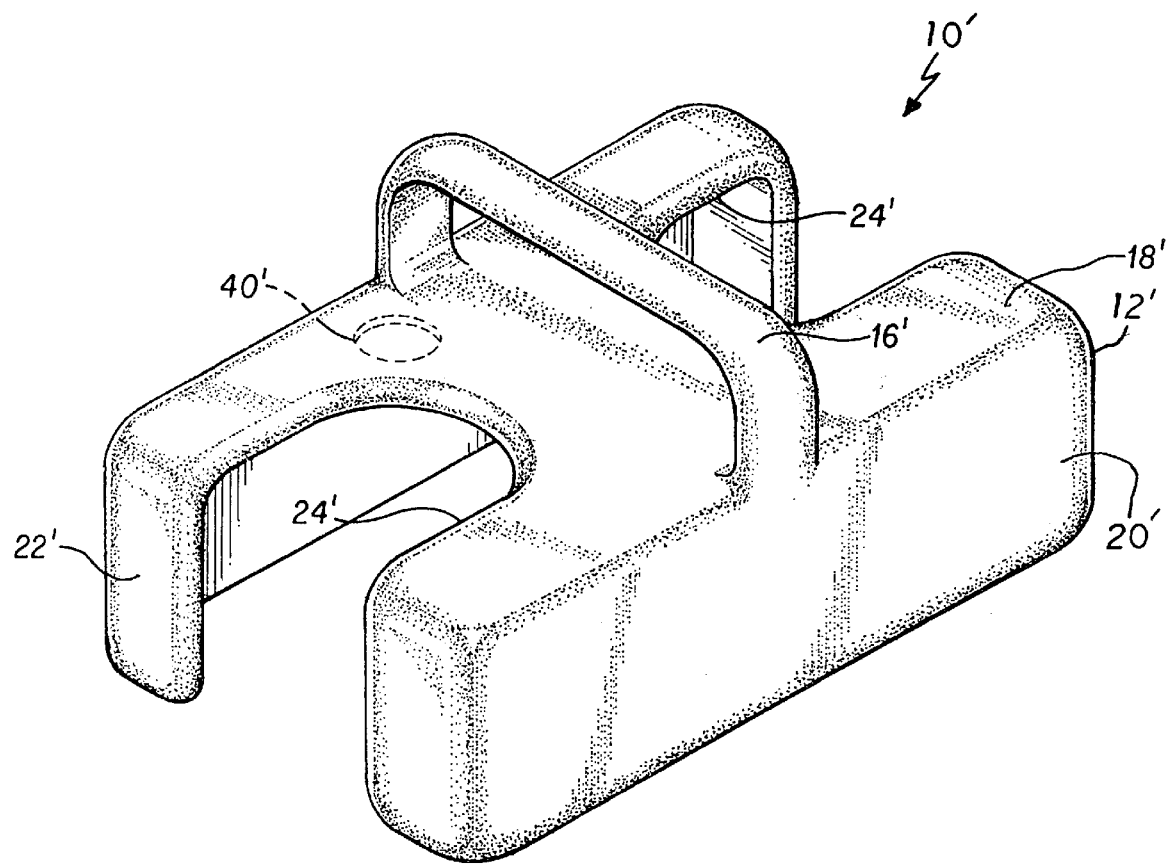
FIG. 4 is a perspective view of an alternate embodiment of the invention.

FIG. 4 is an alternative embodiment of the present invention. In FIG. 4, the pet feeder 10 is a single piece unit which functions with the same results as the two-piece arrangement shown in FIGS. 1–3. The device 10, of FIG. 4 accommodates both individual dishes for food and water, as well as a single compartmented food/water dish. FIG. 4 is a perspective view of the alternative embodiment of the invention 10', showing the unitary shell 12' of substantially rectangular configuration. The unitary shell 12' has a handle 16', a top surface 18', two parallel long side surfaces 20' (one of which is hidden from view) on opposite sides of the top surface, four short side surfaces 22' (one of which is completely hidden from view, with another being partially hidden from view), and two opposite openings 24'. Placed beneath each opening 24' is one or more dishes (such as dish A of FIGS. 1–3) which may contain food or water. Normally, food will be placed in one dish, and water in the other. Alternatively, there could be an additional holder (such as hole 40', or the like) in the unitary shell 12' for retaining a water bottle (not shown in the drawings). Therefore, two different foodstuffs could be placed in the dishes. Like the embodiment shown in FIG. 1, the device 10, prevents a pet (e.g., dog B) with floppy ears C from getting its ears into the dish. The unitary shell 12' is lifted and replaced over the dishes A using the handle 16'. The handle 16' also helps to prevent the animal from reaching directly over from a dish in one opening 24' to the dish in the other opening 24', preventing the scattering of the contents of the dishes. Instead, the pet must walk around from one opening 24' to the other opening 24'.

It is preferable that the openings 24' in the unitary shell 12' are between about three and five inches wide, and more preferably about four inches wide. This is sufficient to allow an animal access to the food, yet sufficiently narrow enough to prevent its ears from falling into the food.

While the invention is illustrated as having a parallelepiped configuration, it is to be understood that other configurations are fully within the scope of the invention. For example, the invention could be oval, ovate or even circular in shape and still be fully functional and within the scope of the invention.

It is to be understood that the present invention is not limited to the sole embodiment described above, but encompasses any and all embodiments within the scope of the following claims.

I claim:

1. An animal feeder, comprising:
    a first member having an upper surface with at least two opposing edges and at least two edge wall members integral to and depending from each of said two opposing edges, said upper surface and said at least two edge wall members of said first member defining a first opening at one of said at least two opposing edges and a second opening at the other of said at least two opposing edges;
    a second member having a substantially planar bottom surface with at least two opposing edges and at least two edge wall members integral to and extending upwardly from each of said two opposing edges, said at least two edge wall members defining a third opening at one of said at least two opposing edges and a fourth opening at the other of said two opposing edges; and
    said first member being configured to be removably seated upon said second member to define a cavity, with said first opening registering with said third opening and said second opening registering with said fourth opening, said bottom surface of said second member being spaced from said upper surface of said first member;
    wherein said first and third openings and said second and fourth openings allow a pet to access a food or water dish located within said cavity defined by said first and second members.

2. The animal feeder according to claim 1, wherein said first and second openings have a width of between about three and five inches.

3. The animal feeder according to claim 2, wherein said first and second openings have a width of about four inches.

4. The animal feeder according to claim 1, wherein said. third and fourth openings have a width of between about three and five inches.

5. The animal feeder according to claim 4, wherein said third and fourth openings have a width of about four inches.

6. The animal feeder according to claim 1, wherein said first member further includes a handle integral to and extending from the other side of said upper surface.

7. The animal feeder according to claim 6, wherein said handle depends from said other side of said upper surface at a position intermediate said first and third openings.

* * * * *